US011893276B2

(12) United States Patent
He

(10) Patent No.: US 11,893,276 B2
(45) Date of Patent: Feb. 6, 2024

(54) APPARATUSES AND METHODS FOR DATA MANAGEMENT IN A MEMORY DEVICE

(71) Applicant: MICRON TECHNOLOGY, INC., Boise, ID (US)

(72) Inventor: Yuan He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 72 days.

(21) Appl. No.: 16/880,193

(22) Filed: May 21, 2020

(65) Prior Publication Data
US 2021/0365210 A1 Nov. 25, 2021

(51) Int. Cl.
G06F 3/06 (2006.01)
G06F 13/16 (2006.01)

(52) U.S. Cl.
CPC .......... G06F 3/0659 (2013.01); G06F 3/0604 (2013.01); G06F 3/064 (2013.01); G06F 3/0679 (2013.01); G06F 13/1668 (2013.01)

(58) Field of Classification Search
CPC ...... G06F 3/0659; G06F 3/0604; G06F 3/064; G06F 3/0679; G06F 13/1668
See application file for complete search history.

(56) References Cited

U.S. PATENT DOCUMENTS

| | | | | |
|---|---|---|---|---|
| 5,430,679 A | * | 7/1995 | Hiltebeitel | G11C 29/785 365/225.7 |
| 5,454,114 A | * | 9/1995 | Yach | G06F 1/24 713/502 |
| 5,504,903 A | * | 4/1996 | Chen | G06F 9/445 712/E9.007 |
| 5,832,194 A | * | 11/1998 | Braun | G11C 16/102 714/48 |
| 7,069,413 B1 | | 6/2006 | Agesen et al. | |
| 9,037,949 B1 | * | 5/2015 | Vogelsang | G11C 29/44 714/724 |
| 2003/0164510 A1 | * | 9/2003 | Dono | G11C 29/785 257/200 |

(Continued)

OTHER PUBLICATIONS

Crooke, Rob et al., "Intel Non-Volatile Memory Inside. The Speed of Possibility Outside" in INTEL Developer Forum, 2015 (revised Apr. 2015).

(Continued)

Primary Examiner — Francisco A Grullon
(74) Attorney, Agent, or Firm — Dorsey & Whitney LLP

(57) ABSTRACT

In some examples, a system may include a plurality of memory blocks, a first data bus coupled to the plurality of memory blocks in a memory device, a second data bus coupled to the plurality of memory blocks, a controller configured to perform memory read and write operations on the plurality of memory blocks via the first data bus, and a non-volatile storage (NVS) data transfer circuit configured to transfer data in a first memory block of the plurality of memory blocks to a NVS device via the second data bus. The first memory block may be a cold data block least accessed among the plurality of memory blocks. The cold data transfer may be performed via the second data bus when a different memory block is being accessed via the first data bus concurrently. The second data bus may be a fuse bus in the memory device.

19 Claims, 8 Drawing Sheets

(56) References Cited

U.S. PATENT DOCUMENTS

| | | | |
|---|---|---|---|
| 2004/0003315 A1* | 1/2004 | Lakhani | G11C 29/76 714/6.13 |
| 2005/0262327 A1* | 11/2005 | Yoshimoto | G06F 12/0284 710/305 |
| 2006/0083085 A1* | 4/2006 | Ikegami | G11C 17/143 365/200 |
| 2008/0062808 A1 | 3/2008 | Kawaguchi et al. | |
| 2012/0155160 A1 | 6/2012 | Alam et al. | |
| 2013/0275682 A1 | 10/2013 | Ramanujan et al. | |
| 2013/0322183 A1* | 12/2013 | Jeong | G11C 8/00 365/189.05 |
| 2014/0181373 A1* | 6/2014 | George | G06F 12/0246 711/103 |
| 2014/0185398 A1* | 7/2014 | Franceschini | G11C 29/789 365/200 |
| 2015/0363107 A1 | 12/2015 | Best et al. | |
| 2016/0259739 A1 | 9/2016 | Woo et al. | |
| 2017/0357581 A1 | 12/2017 | Yanagidaira et al. | |
| 2018/0089079 A1 | 3/2018 | Hansson et al. | |
| 2019/0042120 A1 | 2/2019 | Kajigaya | |
| 2019/0198127 A1* | 6/2019 | Riley | G11C 29/812 |
| 2020/0057729 A1 | 2/2020 | Liu et al. | |
| 2020/0363978 A1 | 11/2020 | Kajigaya | |

OTHER PUBLICATIONS

Hirofuchi, Takahiro et al., "Raminate: Hypervisor-Based Virtualization for Hybrid Main Memory Systems", SoCC 2016: Proceedings of the Seventh ACM Symposium on Cloud Computing, Oct. 2016, https://doi.org/10.1145/2987550.2987570, 112-125.

Knyaginin, Dmitry, "Towards Large-Capacity and Cost-Effective Main Memories", Chalmers University of Technology, Department of Computer Science and Engineering, Doctoral Thesis, Apr. 2017, 1-147.

Meza, Justin et al., Enabling Efficient and Scalable Hybrid Memories Using Fine-Granularity DRAM Cache Management. Published by the IEEE Computer Society 2012, Posted to the IEEE & CSDL on Mar. 15, 2012.

Ramos, Luiz et al., Page Placement in Hybrid Memory Systems, ICS'11, May 31-Jun. 4, 2011, Tuscon, Arizona, USA.

Su, Chunyi et al., "HPMC: An Energy-Aware Managment System of Multi-Level Memory Architectures", MEMSYS 2015: Proceedings of the 2015 International Symposium on Memory Systems, Oct. 2015, https://doi.org/10.1145/2818950.2818974, 167-178.

Merriam Webster's Dictionary: https://web.archive.org/web/20160509133916/https://www,merriam-webster.com/dictionay/of, May 2016, 9 pages.

* cited by examiner

APPARATUSES AND METHODS FOR DATA MANAGEMENT IN A MEMORY DEVICE

BACKGROUND

High speed memory devices, such as dynamic random access memory (DRAM) have become ubiquitous in many electronic devices, such as mobile phones. However, the increasing demand for more memory spaces cannot always be met due to the cost of the DRAM and inflexibility associated with changing the DRAM configuration. In a typical scenario with a mobile phone, a user may have many applications open simultaneously without realizing it. This may cause the DRAM to reach its full capacity, and consequently degrades the performance of the mobile phone. A user may need to manually stop the unused applications to free up more memory space.

DETAILED DESCRIPTION

Various embodiments of the present disclosure will be explained below in detail with reference to the accompanying drawings. The following detailed description refers to the accompanying drawings that show, by way of illustration, specific aspects and embodiments of the disclosure. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

Examples of cold data in a memory device may include data that may be least accessed or data that may be unlikely accessed. The extent of access may refer to memory activities either in a time period in the past or a foreseeable future, and measured by the frequency of accesses, by application usages, by power consumption or other criteria. Memory activities may include either read or write, or a combination of read and write operations. Various examples of cold data are further described throughout the present disclosure.

Figure 1A:
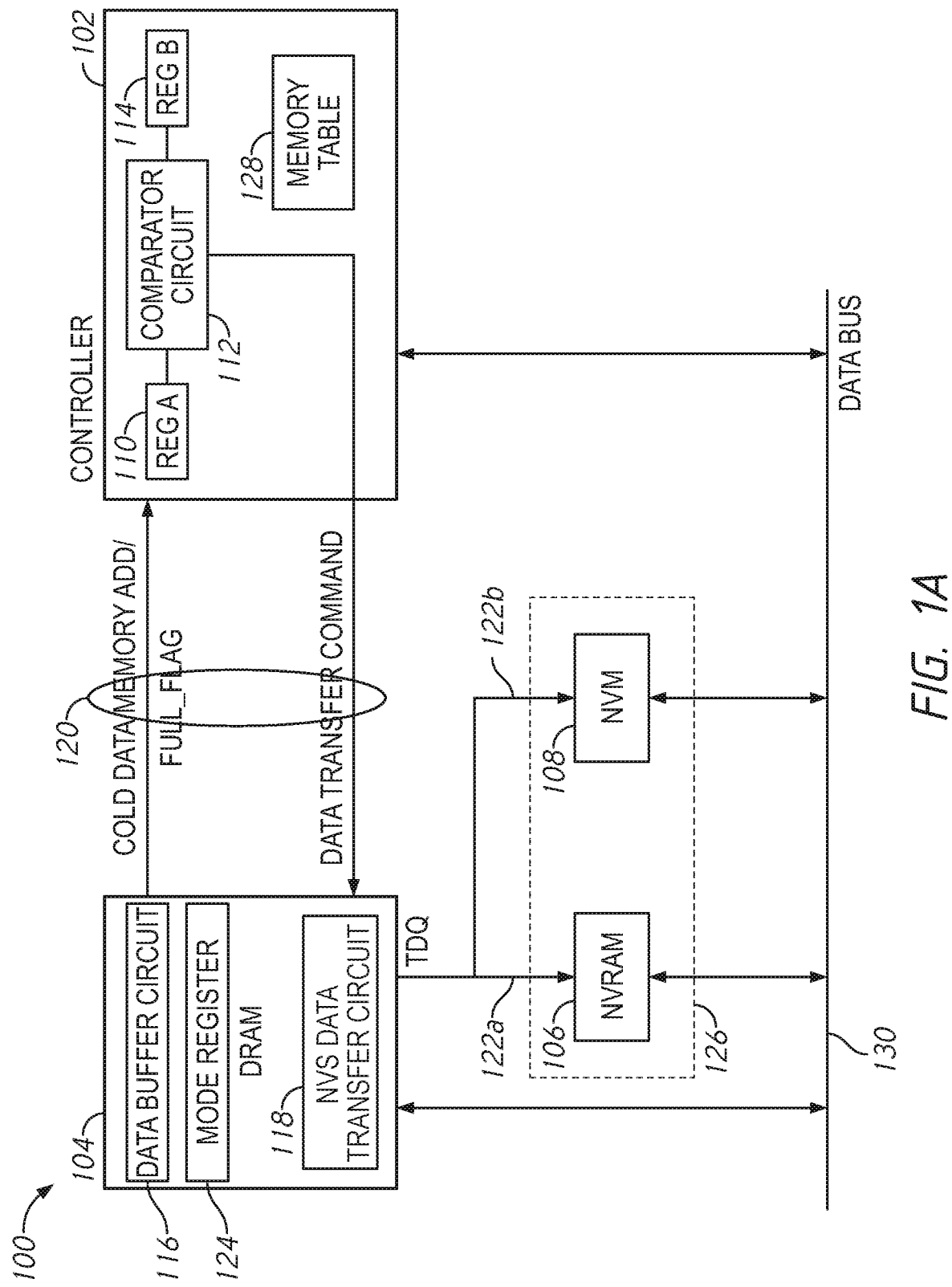
FIG. 1A is a diagram of an example memory system according to some examples of the present disclosure.

FIG. 1A is a diagram of an example memory system in accordance with some examples described herein. A memory system 100 may be implemented in a semiconductor device. The memory system 100 may also be implemented in a circuit board consisting of one or more semiconductor devices and/or various electronic components. In some examples, the memory system 100 may include a controller 102, a memory device 104, e.g., a DRAM, and an NVS 126, which may include various types of NVS devices, such as NVRAM 106 or NVM 108. In some examples, the system 100 may be installed in an electronic device, such as a mobile phone. Any of the devices in the system 100 may be coupled to the data bus 130 to read/write data from/to the data bus 130. For example, the system 100 may be installed in a mobile device, in which the controller 102 may include one or more central processing unit (CPU) capable of running multiple applications. The data processing in these applications may require memory access to the DRAM 104. In some scenarios, as more applications are open in the mobile device, the data stored in the DRAM 104 may cause the DRAM 104 to become full. As the DRAM is becoming full, some of the cold data in the DRAM may be transferred to the NVS, e.g., NVRAM 106 and NVM 108, to free up more memory space in the DRAM. The data management in the DRAM is further explained.

With further reference to FIG. 1A, the controller in the system 100 may be coupled to the DRAM 104 via a data bus 130 and configured to read/write data from/to the memory. The NVS, e.g., 106, 108 may also be coupled to the data bus 130 to provide/receive data to/from the controller 102 or other devices via the data bus 130. Additionally, the DRAM 104 may be coupled to the NVS devices, e.g., 106, 108, via a transfer bus 122a, 122b. For example, the transfer bus 122a, 122b may be a bus between the DRAM and NVS devices. In a non-limiting example, the transfer bus 122a, 122b may be coupled to the test port TDQ of the DRAM. The transfer of data via the transfer bus 122a, 122b may avoid interfering with normal data access on the data bus 130 of the system 100.

Alternatively, and/or additionally, the system 100 may include a cold data transfer control bus 120, e.g., coupled between the DRAM 104 and the controller 102. In some examples, the cold data transfer control bus 120 includes signal lines for transferring information between the DRAM 104 and controller 102. In some embodiments, data in a first memory block may be transferred in the cold data transfer control bus 120 concurrently while data in a second memory block being accessed in the data bus 130 in a normal memory access operation, where the first memory block and second memory block are different. For example, the first memory block may contain cold data or cold data memory address, and the second memory block may contain data for normal memory access operations. The cold data transfer control bus 120 may be uni-directional or bi-directional, and may include one or more bits. For example, the controller 102 may receive from the DRAM a memory full flag, e.g., an active FULL_FLAG (at logic high), which indicates that the DRAM is becoming full. Additionally, the controller 102 may also receive cold data memory address from the DRAM 104. In response to the active FULL_FLAG, the controller 102 may provide a data transfer command to the DRAM 104 via the cold data transfer control bus 120.

In some examples, the cold data may include a data block that is not frequently used, or least frequently used, which may be determined in various ways. For example, the DRAM 104 may determine which data block is accessed the least from multiple prior accesses of the memory cells in the DRAM during a time period. In some examples, writing a data block may take longer time than reading a data block. Cold data may be determined to be a data block that has the least amount of memory write operations during a time period. It is appreciated that other ways of determining cold data may also be possible.

In some examples, the DRAM may detect a memory full alert, and subsequently set the FULL_FLAG at active high. For example, if it is determined that the DRAM has reached 90% full, then the FULL_FLAG may become active and is set to a high logic level. In other examples, the FULL_FLAG is set to high when the DRAM has reached 95%, 85%, 80%, 75%, or any other suitable level. At other times, the FULL_FLAG may be inactive and set to a low logic level.

As described above, the DRAM 104 may transfer the memory address of the cold data in the DRAM to the controller 102, via the cold data transfer control bus 120. The memory address may represent a smallest data block for cold data that may be transferred between the DRAM 104 and the NVS. For example, a memory array may include multiple memory banks, each including multiple memory segments. Accesses to various memory banks and segments may be managed by a segment masking table. In some examples, the segment masking table may be configured so that there is one segment mask (multiple bits) per memory bank, where the segment may be dynamically assigned to match the memory block size. In a non-limiting example, the smallest data block for cold data may be the memory segment within a given memory bank. Then, the memory address of the cold data may include the bank number and the segment number. Communication between the memory controller 102 and the DRAM 104 is further explained.

In some examples, the controller 102 may include a first register, e.g., REG A (110) configured to store the memory address of the cold data received from the DRAM 104. In some examples, the cold data transfer control bus 120 may include a serial connection to transfer information in a serial fashion. In such case, the DRAM 104 may include a data buffer circuit, such as a first-in-first-out (FIFO) buffer 116 configured to transfer the memory address to the controller 102 in a serial fashion. Alternatively, the cold data transfer control bus 120 may include multiple bits to transfer the memory address in a parallel fashion. For example, each of the memory banks in the DRAM 104 may include 128 segments. In that case, the cold data transfer control bus 120 may include at least 7 bits to transfer the segment numbers. The cold data transfer control bus 120 may also be configured to include a higher number of bits to transfer the bank number of the cold data (e.g., 10 bits to accommodate a total of 1024 banks). In some examples, the controller 102 may include a second register, e.g., REG B (114) and a comparator circuit 112. The controller 102 may also be configured to send a data transfer command to the DRAM 104, via the cold data transfer control bus 120.

In operation, in response to receiving an active FULL_FLAG (e.g., at logic high) and the cold data memory address, the controller 102 may be configured to determine whether the DRAM should transfer the cold data to the NVS (e.g., 106, 108). In determining whether the DRAM should transfer the cold data, the controller 102 may determine whether such transfer of cold data will interfere with any ongoing memory access operation. For example, REG B may store the current memory address of data being transferred during a pending memory access operation. The comparator circuit 112 may be configured to compare the memory address of the cold data in REG A 110 and the current memory address in the pending memory operation in REG B 114. If there is a match between the memory addresses in REG A 110 and REG B 114, the controller 102 may determine to suspend transfer of cold data because such transfer could interfere with the normal memory operation on the current memory address. If there is not a match between the memory address in REG A 110 and REG B 114, then the controller 102 may determine that that the cold data in the DRAM can be transferred to the NVS (e.g., 106, 108) without interfering with the memory operation on the current memory address because cold data memory address and the current memory address being accessed correspond to different memory blocks. In such case, the controller 102 may send a data transfer command to the DRAM 104, via the cold data transfer control bus 120.

In some examples, the DRAM 104 may include a mode register 124. The data transfer command from the controller 102 to the DRAM 104 may be a mode register command. For example, the DRAM may include a cold data mode that is enabled by programming a setting in a mode register, such as by a mode register write operation. In such case, sending a data transfer command from the controller to the DRAM may include the controller setting the cold data mode in the DRAM, where the cold data mode indicates a start of cold data transfer. In response to receiving the data transfer command from the controller 102 (e.g., to set the cold data mode), the DRAM may be configured to start transferring the cold data to the NVS device (e.g., 106, 108).

With further reference to FIG. 1A, the DRAM 104 may include an NVS data transfer circuit 118 configured to control the transfer of cold data. In some examples, the DRAM 104 may include an internal data bus for normal memory access operations. The DRAM 104 may also include another data bus, for example, the fuse bus. The fuse bus may be used to push the data set in the fuse array to the fuse latch circuits in the memory row and column decoders at the power up of the memory device. After the power up, the DRAM 104 may use the fuse bus to transfer the cold data, thus eliminate any interference with the memory access on the first data bus.

In some examples, the DRAM may transfer the cold data in the DRAM from the DRAM to the NVS device via the second data bus in the DRAM and the transfer bus 122a, 122b to the NVS device. In transferring the cold data, the memory address (e.g., memory bank and segment numbers) of the cold data may be previously determined in the DRAM and stored in the DRAM (e.g., in a register). The destination address for cold data transfer in the NVS device may be determined by the controller 102, which also provides the destination address to the destination NVS device (e.g., 106, 108). In this configuration, the transfer of cold data from the DRAM to the NVS device is controlled by the controller 102. For example, the controller may determine the type of NVS device and the address to which the cold data should be transferred.

In a non-limiting example, each of the memory blocks (e.g., memory segment in a given memory bank) may have an associated read/write tag, indicating the type of memory operation associated with that memory block. If the memory block is accessed for data read, the read/write tag may be "READ"; if the memory block is accessed for data write, the read/write tag may be "WRITE." The access speed for a memory block may be different for read and write operations, for example, write operations may require a longer access time than read operations. In some examples, the controller 102 may determine what type of memory operation is associated with the cold data, and determine the type of NVS device based on the type of memory operation associated with the cold data. For example, the NVRAM may have a faster access speed than the NVM. If the read/write tag associated with the cold data is "WRITE," then the controller 102 may designate the destination NVS device to be the "faster" device, e.g., NVRAM. Conversely, if the read/write tag associated with the cold data is "READ," then the controller may designate the destination NVS device to be the "slower" device, e.g., NVM. It is appreciated that other configurations in terms of what type of NVS device is chosen may be possible.

In some examples, the controller 102 may further include a memory table 128, which keeps track of the addresses of physical locations of data. Once the cold data transfer to the NVS device is complete, the DRAM 104 may notify the controller 102 by updating the FULL_FLAG, e.g., changing the FULL_FLAG from the active high logic state to an inactive low logic state. Upon receiving the updated inactive FULL_FLAG, the controller 102 may update the memory table 128. This is further explained in FIG. 1B.

Figure 1B:
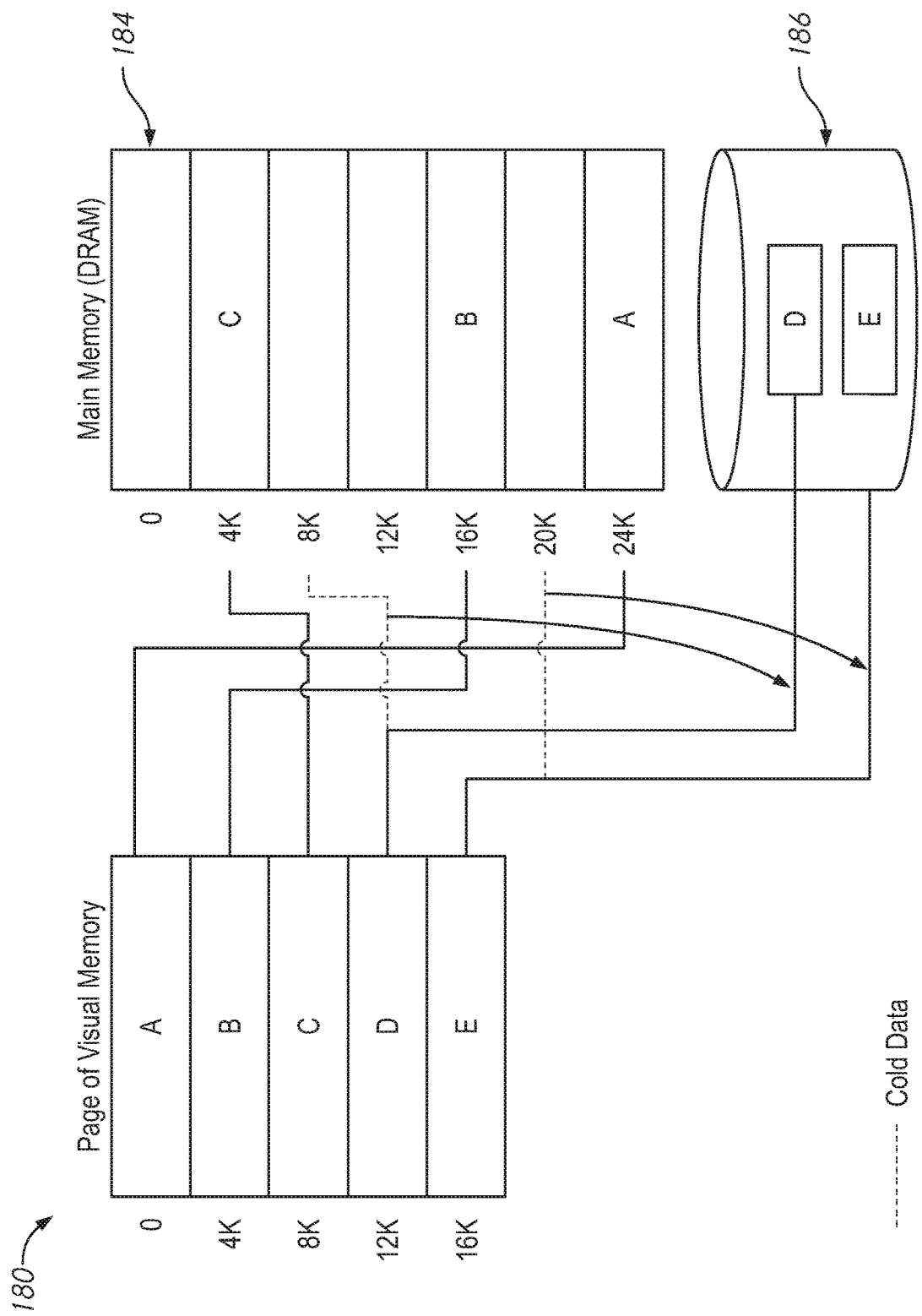
FIG. 1B is a diagram of an example memory mapping table according to some examples of the present disclosure.

FIG. 1B is a diagram of an example memory mapping table according to some examples of the present disclosure. In some examples, a memory mapping table 180, such as a page of visual memory may be included in the controller 102 (FIG. 1A) and used for controlling various memory operations. The memory mapping table 180 may contain a plurality of memory addresses per memory page or memory block. In the example shown in FIG. 1B, each memory block contains 4K bytes of data. Other memory block size may also be possible. In some examples, each value in the visual memory page 182 may include an address corresponding to a physical memory location in the DRAM 184 or an address to a physical memory location in the NVS device 186. The NVS device may be an NVRAM, NVM or any other suitable non-volatile storage devices. In the example in FIG. 1B, once cold data is moved to a NVS device, the memory mapping table 180 in the controller may be updated. For example, the addresses in memory location D correspond to the cold data. Once the cold data is transferred from the DRAM to the NVS device, such as a data location in NVS device 186, the addresses in memory location D may be updated to include the addresses corresponding to the data locations in the NVS device 186.

Figure 2:
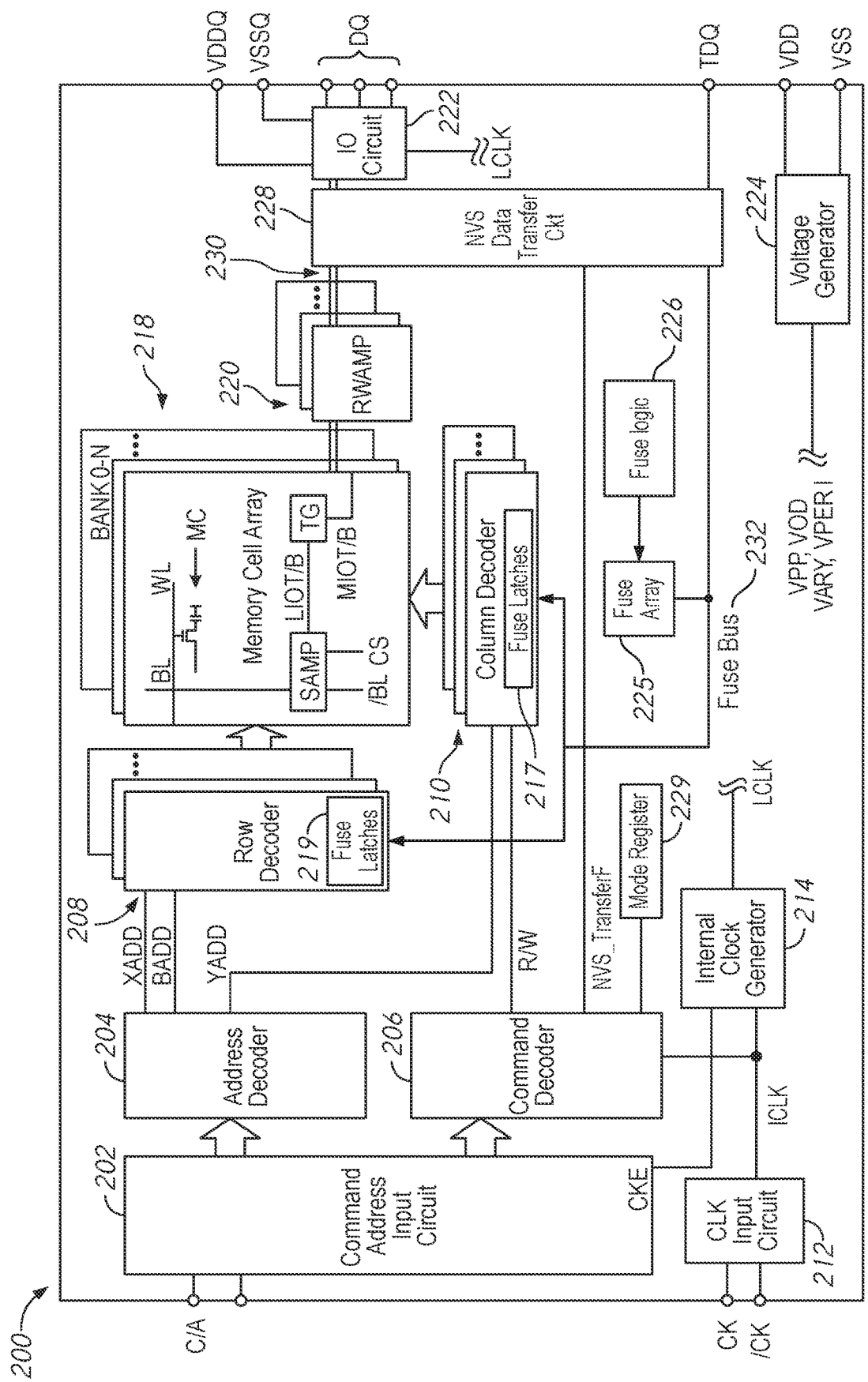
FIG. 2 is a diagram of a portion of an example memory device according to some examples of the present disclosure.

FIG. 2 is a diagram of a portion of an example memory device according to some examples of the present disclosure. The memory device 200 may implement the DRAM (e.g., 104 in FIG. 1A) in some examples. The memory device 200 may be implemented in a semiconductor device. In some examples, the memory device 200 may include a CLK input circuit 212, an internal clock generator 214, an address/command input circuit 202, an address decoder 204, a command decoder 206, a plurality of row (e.g., first access line) decoders 208, a memory cell array 218 including sense amplifiers SAMP and transfer gates TG, a plurality of column (e.g., second access line) decoders 210, read/write amplifiers (RWAMP) 220, an input/output (I/O) circuit 222, a voltage generator circuit 224, a fuse array 225, a fuse logic 226, and NVS data transfer circuit 228. The semiconductor device 200 may include a plurality of external terminals including address and command terminals C/A coupled to command/address bus, clock terminals CK and/CK, data terminals DQ, DQS, and DM, and power supply terminals VDD and VSS.

The memory cell array 218 includes a plurality of banks, e.g., BANK0-N. In some examples, the memory cell array 218 may include more or fewer than 8 banks without departing from the scope of the disclosure. Each bank BANK0-N may include a plurality of word lines WL, a plurality of bit lines BL, and a plurality of memory cells MC arranged at intersections of the plurality of word lines WL and the plurality of bit lines BL. The selection of the word line WL for each bank BANK0-N is performed by a corresponding row decoder 208 and the selection of the bit line BL (/BL) is performed by a corresponding column decoder 210. For example, the column decoder 201 may provide the column select (CS) signal. The plurality of sense amplifiers SAMP are located for their corresponding bit lines BL and coupled to at least one respective local I/O line further coupled to a respective one of at least two main I/O line pairs, via transfer gates TG, which function as switches. The sense amplifiers SAMP and transfer gates TG may be operated based on control signals from decoder circuitry, which may include the command decoder 206, the row decoders 208, the column decoders 210, any control circuitry of the memory cell array 218 of the banks BANK0-N, or any combination thereof.

The command/address input circuit 202 may receive an address signal and a bank address signal from outside at the command/address terminals C/A via a command/address bus and transmit the address signal and the bank address signal to the address decoder 204. The address decoder 204 may decode the address signal received from the command/address input circuit 202 and provide a row address signal XADD to the row decoder 208, and a column address signal YADD to the column decoder 210. The address decoder 204 may also receive the bank address signal and provide the bank address signal BADD to the row decoder 208 and the column decoder 210.

The command/address input circuit 202 may receive a command signal externally, such as, for example, from a memory controller at the command/address terminals C/A via the command/address bus and provide the command signal to the command decoder 206. The command decoder 206 may decode the command signal and generate various internal command signals. For example, the internal command signals may include a row command signal to select a word line, or a column command signal, such as a read command or a write command, to select a bit line.

Accordingly, when an activation command is issued and a row address is timely supplied with the activation command, and read command is issued and a column address is timely supplied with the read command, read data is read from a memory cell in the memory cell array 218 designated by the row address and the column address. The RWAMP 220 may receive the read data DQ and provide the read data DQ to the IO circuit 222 via the internal data bus 230. The IO circuit 222 may provide the read data DQ to outside via the data terminals DQ. Similarly, when an activation command is issued and a row address is timely supplied with the activation command, and a write command is issued and a column address is timely supplied with the write command, the IO circuit 222 may receive write data at the data terminals DQ and provide the write data via the internal data bus 230 to the RWAMP 220 to the memory cell array 218. Thus, the write data may be written in the memory cell designated by the row address and the column address.

Turning to the explanation of the external terminals included in the semiconductor device 200, the clock terminals CK and/CK may receive an external clock signal and a complementary external clock signal, respectively. The external clock signals (including complementary external clock signal) may be supplied to a clock input circuit 212. The clock input circuit 212 may receive the external clock signals and generate an internal clock signal ICLK. The clock input circuit 212 may provide the internal clock signal ICLK to an internal clock generator 214. The internal clock generator 214 may generate a phase controlled internal clock signal LCLK based on the received internal clock signal ICLK and a clock enable signal CKE from the command/address input circuit 202. Although not limited thereto, a DLL circuit may be used as the internal clock generator 214. The internal clock generator 214 may provide the phase controlled internal clock signal LCLK to the IO circuit 222. The IO circuit 222 may use the phase controller internal clock signal LCLK as a timing signal for determining an output timing of read data.

The power supply terminals may receive power supply voltages VDD and VSS. These power supply voltages VDD and VSS may be supplied to a voltage generator circuit 224. The voltage generator circuit 224 may generate various internal voltages, VPP, VOD, VARY, VPERI, and the like based on the power supply voltages VDD and VSS. The internal voltage VPP is mainly used in the row decoder 208, the internal voltages VOD and VARY are mainly used in the sense amplifiers SAMP included in the memory cell array 218, and the internal voltage VPERI is used in many other circuit blocks. The IO circuit 222 may receive the power supply voltages VDD and VSSQ. For example, the power supply voltages VDDQ and VSSQ may be the same voltages as the power supply voltages VDD and VSS, respectively. However, the dedicated power supply voltages VDDQ and VSSQ may be used for the IO circuit 222.

In some examples, the semiconductor device 200 may use various configuration parameters or settings during power-up and operation, such as start-up parameters and settings, redundancy settings, options settings, identification (ID) settings, or any combination thereof. The configuration parameters may be used by the semiconductor device 200 to specify operational characteristics, such as voltage levels, timing configurations, I/O and other bus configurations, etc. Some of the configuration parameters or settings may be associated with redundancy configurations, such as identifying which memory addresses are to be redirected from a defective row or column of memory cells to a redundant row or column of memory cells.

The semiconductor device 200 may include the fuse array 225 that includes a plurality of programmable storage elements (e.g., fuses, anti-fuses, etc.) configured to store fuse data for the configuration parameters and settings. For example, the storage elements may store addresses of defective memory of the memory cell array, start-up parameters and settings, redundancy settings, options settings, identification (ID) settings, or any combination thereof. Some of the information (e.g., fuse data) stored in the fuse array 225 may be provided to circuits of the semiconductor device 200 upon start up (e.g., power-up), such as the command decoder 206, the row decoder 208, the column decoder 210, the clock input circuit 212, the internal clock generator 214, the voltage generator circuit 224, the IO circuit 222, etc.

The row decoder 208 may include fuse latches 219 that store fuse data, such as the memory addresses of redundant memory cells corresponding to defective memory cells. The column decoder 210 may also include fuse latches 217 and operate in a similar manner as the row decoder 208. In some examples, the fuse data may be used to configure operation of the semiconductor device 200, for example, in a fuse read operation early in a power-up sequence. In a non-limiting example, the fuse data stored in the fuse array 225 may be divided into subsets of bits (e.g., subsets of data) that are serially broadcast from the fuse array 225 to the fuse bus 232, during a power-up sequence. The fuse logic 226 may latch each respective subset of bits of the fuse data and may provide the respective subset of bits to the fuse latches in the row decoder 208 and/or the column decoder 210.

In some examples, the row decoder 208 and/or the column decoder 210 may subsequently use the fuse data to determine which memory addresses should be directed to a redundant row or column of memory cells. For example, an XADD may correspond to a defective memory cell. In the row decoder 208, when the XADD is received at the row decoder 208, the XADD is compared with the values in the fuse latches 219 and directed to the address of the redundant physical memory location in the memory banks BANK0-N. The column decoder 210 may operate in a similar manner as the row decoder 208.

With further reference to FIG. 2, the NVS data transfer circuit 228 may be coupled to the RWAMP 220 and the fuse bus. The NVS data transfer circuit 228 may also be coupled to an external terminal, e.g., TDQ, a testing port. In some examples, the terminal TDQ may be connected to a NVS device, such as NVRAM or NVM (106, 108 in FIG. 1A). The NVS data transfer circuit 228 may also be coupled the internal data bus 230, and configured to redirect data to/from the memory cell array for normal memory operation. For example, the NVS data transfer circuit 228 may be configured to redirect data from the memory cell array to the internal data bus 230 (via RWAMP 220) or redirect data from the internal data bus to the memory cell array (via RWAMP 220).

A NVS data transfer signal NVS_TransferF may be provided from the command decoder 206 to the NVS data transfer circuit 228. In some examples, the NVS_TransferF becomes active responsive to receiving the data transfer command from the controller (e.g., 102 in FIG. 1A). For example, the semiconductor device 200 may include a mode register 229 configured to store a data transfer command set from the controller 102 (FIG. 1A). The mode register 229 may be included in the mode register 124 (in FIG. 1A). The data transfer command may correspond to a cold data mode being set. This may cause the command decoder 206 to provide an active cold data transfer command, e.g., an active low NVS_TransferF signal. In cold data transfer, responsive to an active NVS_TransferF signal, the NVS data transfer circuit 228 may direct the data provided from the memory cell array to the fuse bus (via RWAMP 220), to be further transferred to the NVS device. This is explained in detail in the present disclosure.

Figure 3A:
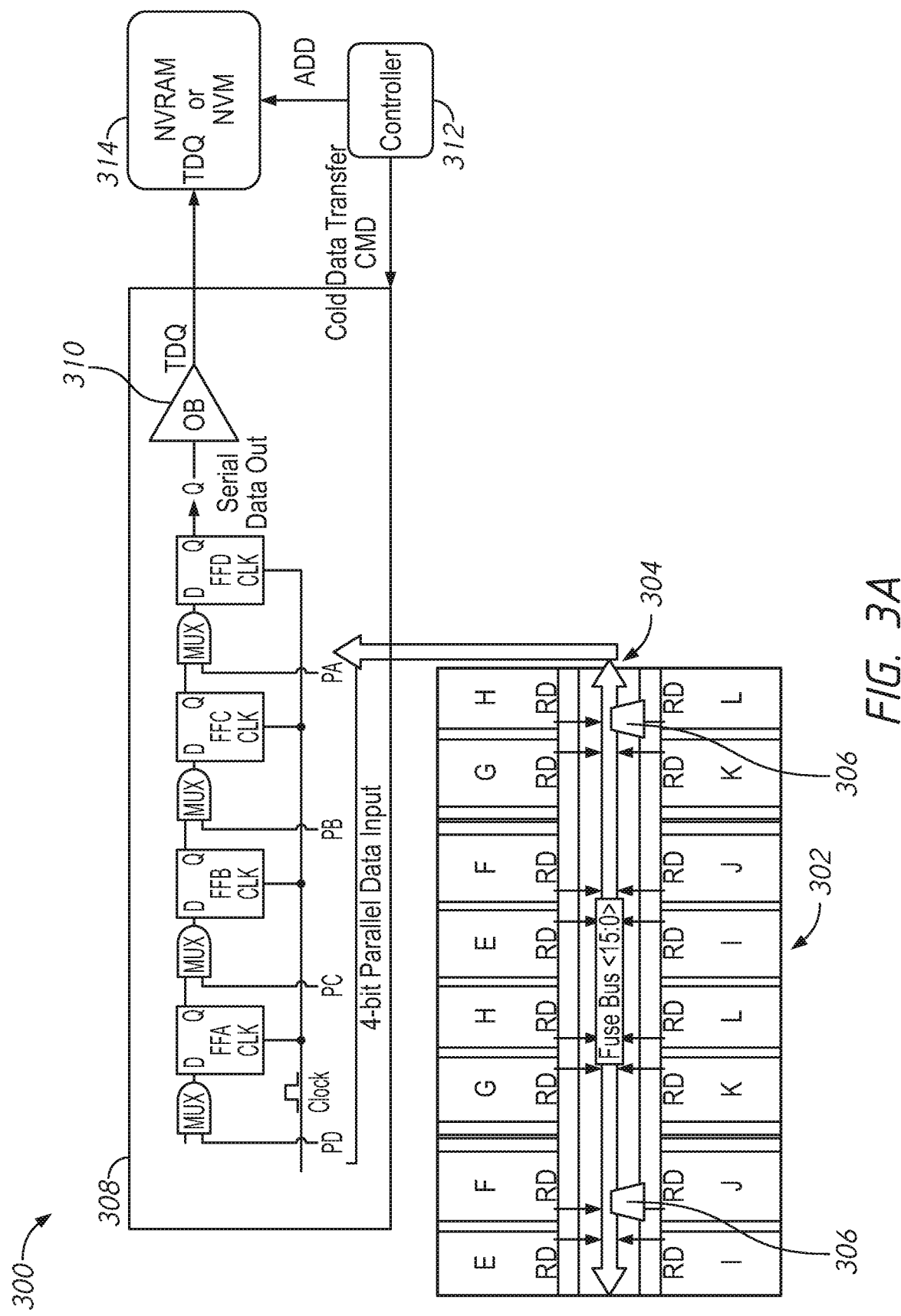
FIG. 3A is a diagram of a portion of an example memory device according to some examples of the present disclosure.

FIG. 3A is a diagram of a portion of an example memory device according to some examples of the present disclosure. The various components in an example memory device 300 may be implemented in the DRAM 104 (FIG. 1A) and the memory device 200 (FIG. 2). For example, the memory array 302 may be included in the memory array of the DRAM 104 (FIG. 1A) or the memory banks 218 (FIG. 2). The fuse bus 304 may be included in the memory device 200 (FIG. 2). As shown in FIG. 3A, the memory banks, e.g., E, F, G, H, I, J, K and L may be coupled to the fuse bus 304. Other numbers of memory banks included in the memory array 302 may also be possible.

The memory device 300 may further include a plurality of selector circuits 306. For example, a selector circuit may be coupled to the fuse bus and also coupled to a respective memory bank. The selector circuit may be configured to direct the data from the respective memory bank to the fuse bus. In the example as shown in FIG. 3A, a read operation (RD) of a memory bank may direct the data from the memory bank to a respective selector circuit 306, which may direct the data to the fuse bus 304. The selector circuit will be further explained in detail in FIG. 3C.

The above described device 300 may be configured to perform the cold data transfer from the DRAM to the NVS device, such as from DRAM 104 to NVS device (106, 108) in FIG. 1A. As the cold data transfer is performed via the fuse bus independently and concurrently of normal memory access in a DRAM, the normal memory access to other data blocks is not interrupted. In some examples, the cold data transfer may be performed responsive to a data transfer command, whereas the normal memory access may be performed responsive to a memory access command. Because the cold data transfer and the normal memory access operations are performed concurrently via different data buses, the speed requirement of the cold data transfer is not particularly important. For example, the multiple-bit cold data from the memory bank can be converted to serial output via a parallel-to-serial circuit 308.

Now, with further reference to FIG. 3A, the memory device 300 may include a parallel-to-serial circuit 308. The parallel to serial circuit 308 may be coupled to the fuse bus and also coupled to the TDQ port of the DRAM device. In some examples, the parallel-to-serial circuit 308 may be configured to convert parallel data in the fuse bus to serial data to be transferred to the NVS device 314, e.g., NVRAM or NVM, through the TDQ port. The parallel-to-serial circuit 308 may also include an output buffer 310 configured to output the serial data to the NVS device 314. In some examples, the parallel-to-serial circuit 308 may include multiple D-flips to serially output the multiple bits of data in the fuse bus. It is appreciated that including other parallel-to-serial circuits may also be possible. The output buffer 310 may include a CMOS transistor.

Figure 3B:
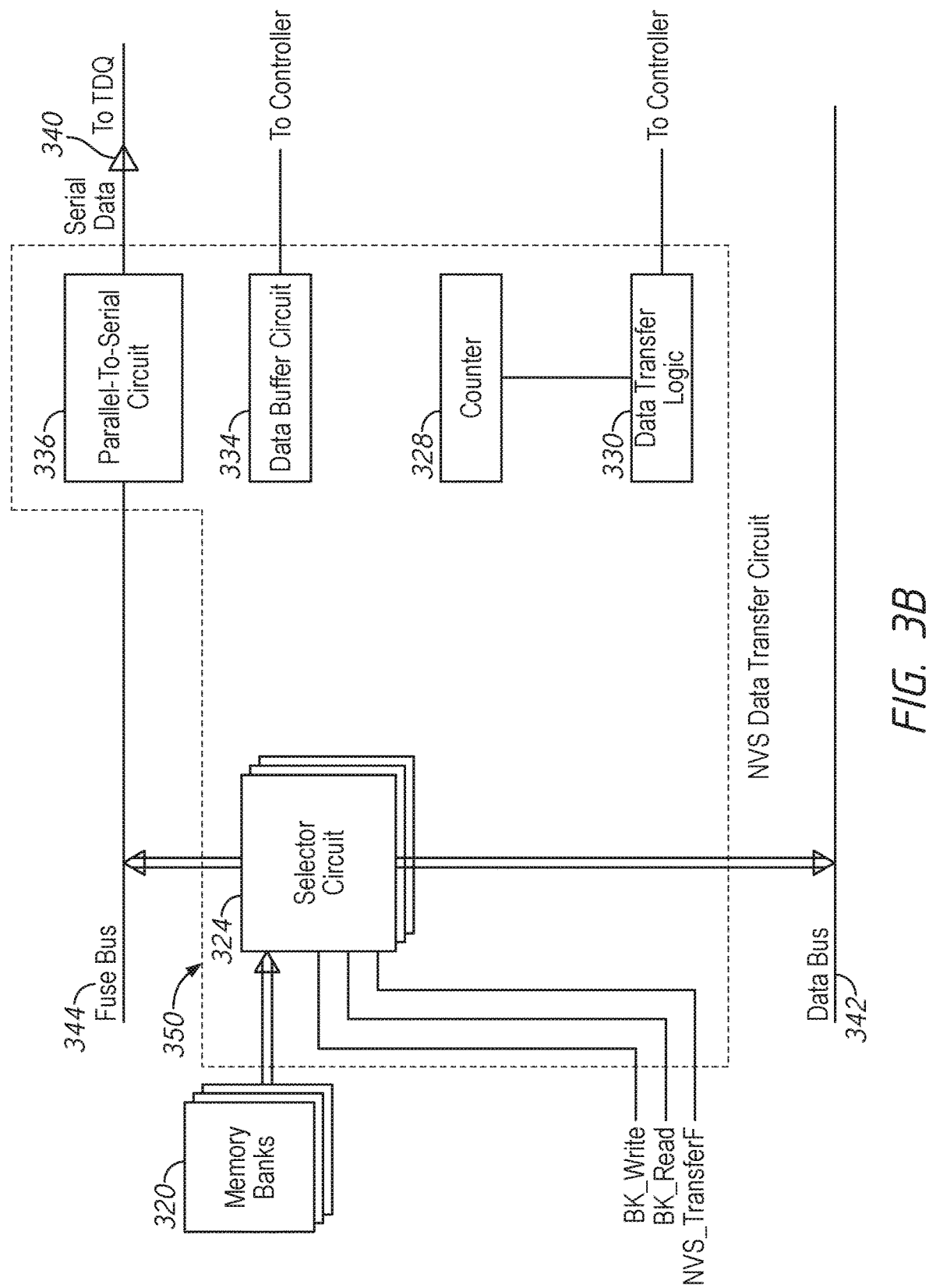
FIG. 3B is a diagram of an example non-volatile storage (NVS) data transfer circuit according to some examples of the present disclosure.

FIG. 3B is a diagram of an example NVS data transfer circuit according to some examples of the present disclosure. The NVS data transfer circuit 350 may be implemented in the DRAM 104 (FIG. 1A), the memory device 200 (FIG. 2), or a part of the memory device 300 (FIG. 3A). NVS data transfer circuit 350 may be coupled to the memory banks 320. In FIG. 3B, only one NVS data transfer circuit is shown for illustration. However, in other examples, the NVS data transfer circuit 350 may include multiple circuits each coupled to a respective memory bank.

In some examples, the NVS data transfer circuit 350 may include a data buffer circuit 334 configured to transmit cold data information to the controller. The cold data information may include the memory address of the cold data (e.g., memory bank and segment numbers). The cold data information may also include a memory full flag, e.g., FULL_FLAG. An active (e.g., logic high) FULL_FLAG may indicate that the memory in the DRAM is becoming full (e.g., 95%, 90%, 85%, 80%, or any other suitable threshold). In some examples, the data buffer circuit 334 may include a FIFO circuit configured to convert the memory address of the cold data in multiple bits to a series of bits for serial output to the controller. The NVS data transfer circuit 350 may further include a data transfer logic 330. In some examples, once the cold data mode in the mode register (e.g., 124 in FIG. 1A, 229 in FIG. 2) is set (e.g., to a logic high value), a command decoder (e.g., command decoder 206 of FIG. 2) may trigger the data transfer logic 330 to begin transferring the cold data to the target NVS device, e.g., a NVRAM or NVM, or other non-volatile storage devices.

In some examples, the NVS data transfer circuit 350 may include a selector circuit 324 coupled to the memory banks 320 in the DRAM, and also coupled to the data bus 342 and the fuse bus 344. For example, the data bus 342 may include the internal data bus 230 (in FIG. 2). The fuse bus 344 may include the fuse bus 232 (in FIG. 2) or the fuse bus 304 (in FIG. 3A). In some examples, the selector circuit 324 may include multiple selector circuits each associated with a respective memory bank. This allows concurrent data transfer for cold data via the fuse bus 344 and memory access via the data bus 342 for different memory banks. For example, as shown in FIG. 3A, a selector circuit 306 associated with a respective memory bank in the memory array 302 may be implemented in the NVS data transfer circuit 350. The selector circuit 324 may be coupled to various control lines. For example, the selector circuit 324 may be coupled to bank read/write signals, e.g., BK_Write, BK_Read, for a respective bank. The selector circuit 324 may also be coupled to the NVS_TransferF line. In a non-limiting example, as shown in FIG. 2, an active NVS_TransferF signal may be provided from the command decoder 206, responsive to a cold data transfer command from the controller (e.g., 102 in FIG. 1A).

In some examples, the NVS data transfer circuit 350 may further include a counter circuit 328 coupled to the data transfer logic 330. The counter circuit 328 may be configured to determine when the cold data transfer is complete. Responsive to the determination that the cold data transfer is complete, the data transfer logic 330 may be configured to send a flag to the controller to indicate the completion of data transfer, so that the controller may update the memory mapping table. In a non-limiting example, upon completion of the cold data transfer, the data transfer logic 330 may send an inactive (e.g., logic low) FULL_FLAG flag to the controller 102 (FIG. 1A).

In operation, upon the setting of the cold data mode in the mode register (e.g., 124 in FIG. 1, 229 in FIG. 2), the data transfer logic 330 may begin transferring the cold data from the DRAM to the target NVS device selected by the controller. The address of the cold data may be stored in the DRAM, in an example. The address of the target NVS device may be set in the target NVS device by the controller (e.g., 102 in FIG. 1A). As described in the embodiments in FIG. 1A, the target NVS device may be determined by the controller based on a "read/write" flag associated with the cold data. In transferring the cold data, each data block in the cold data is provided from a respective memory bank in the plurality of memory banks 320 to a corresponding selector circuit 324 of the NVS data transfer circuit 350. If the NVS_TransferF is active (e.g., at logic low) and the memory bank associated with the NVS data transfer circuit 350 is not performing any normal read/write operation (e.g., both BK_write and BK_read signals are inactive, e.g., at logic low), then the selector circuit 324 may direct the data from the memory bank to the fuse bus. In normal memory operations, the selector circuit 324 does not redirect the data from the memory bank to fuse bus, and instead, redirect data from the data bus to the memory bank or from the memory bank to the data bus.

With further reference to FIG. 3B, the NVS data transfer circuit 350 may include a parallel-to-serial circuit 336. Once the cold data is directed to the fuse bus, the parallel-to-serial circuit 336 in the DRAM may be configured to convert the multiple-bit cold data to a series of bits and provide the serial bits to an output buffer 340 to the TDQ port for transfer to the NVS device. An example of parallel-to-serial circuit is provided in 308 (FIG. 3A), as previously described. Other implementations of the parallel-to-serial circuit is possible. For example, one or more circuits may be configured to convert 16-bit parallel data into serial data, each provided at a clock cycle. The clock may be the internal clock or phase controlled internal clock of the DRAM device, such as ICLK or LCLK (FIG. 1A). In such example, at every clock cycle of the ICLK or LCLK, one of the bits of the 16-bit data is provided. In other words, it will take 16 clock cycles to output the 16-bit data in such examples. Alternatively, the number of clock cycles to output the cold data may vary. For example, each bit of the cold data may be clocked at both rising edges and falling edges of the clock, thus, 8 clock cycles are needed to output 16 bits of cold data.

In some examples, the counter circuit 328 may be activated at the time the NVS_TransferF signal becomes active low. In other examples, a counter enable signal may become active responsive to an active NVS_TransferF signal, and the active counter enable signal triggers the counter circuit 328 to start counting. Subsequently, when the number of counts have elapsed, the counter circuit 328 may provide a finish control signal to the data transfer logic 330 to cause the data transfer logic 330 to provide an inactive FULL_FLAG flag (e.g., at a logic low) to the controller (e.g., 102 in FIG. 1A). In some examples, each data in the cold data (e.g., 16 bits) takes 16 clock cycles to be provided to the NVS device. In such examples, if a memory segment in a memory bank has 1024 rows and 128 columns, then the counter circuit 328 may be configured to provide the finish control signal to the data transfer logic 330 at 1024×128×16 clock cycles after the counter enable signal became active. Subsequently, the data transfer logic 330 sends an inactive FULL_FLAG flag to the controller (e.g., 102 in FIG. 1A).

Alternatively, and/or additionally, the counter circuit 328 may be configured to provide the finish control signal based on asynchronous reset signals associated with the word line select signals. For example, as in the above example, a memory segment in a bank may have 1024 rows. In such case, the counter circuit may increment when each of the word lines WL<0>, WL<1>, WL<2>, . . . , becomes active until WL<1024>, at which time the counter circuit provides the finish control signal. In this configuration, only word lines are counted, but no clock cycles need to be counted.

Figure 3C:
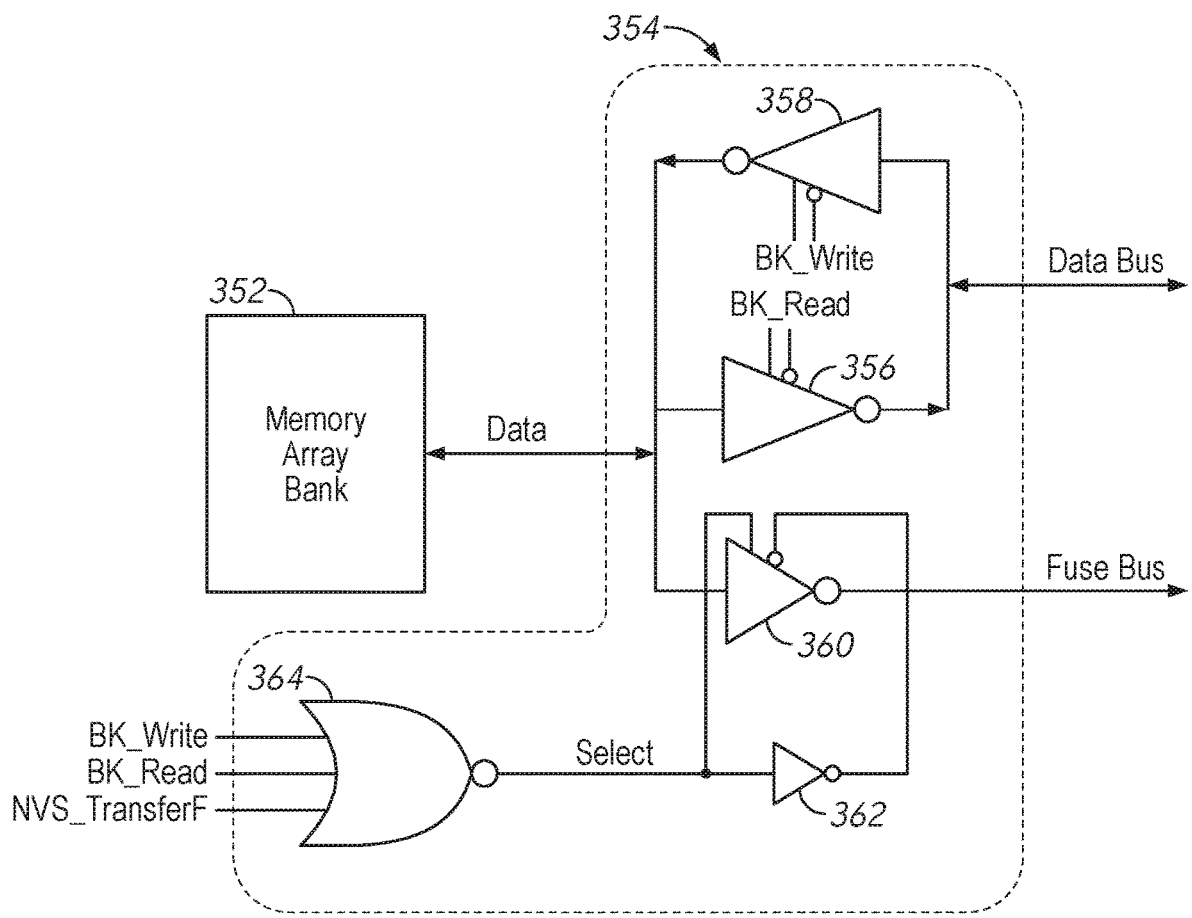
FIG. 3C is a diagram of an example selector circuit according to some examples of the present disclosure.

FIG. 3C is a diagram of an example selector circuit according to some examples of the present disclosure. In some examples, the selector circuit 354 may be an example implementation of the selector circuit 324 (FIG. 3B). The selector circuit 354 may include a controlled buffer 360 having complementary control inputs. For example, a non-inverting control input may be coupled to a select control circuit 364 configured to provide a SELECT signal. An inverting control input may be coupled to an inverter 362, which is coupled to the select control circuit 364. In other words, the signals at the non-inverting control input and the inverting control input may be complementary signals. Responsive to an active SELECT signal (e.g., logic high), the controlled buffer 360 is configured to provide the data from the memory array 352 to the fuse bus. Responsive to an inactive SELECT signal (e.g., logic low), the output of the controlled buffer 360 may be floating.

With further reference to FIG. 3C, the select control circuit 364 may include a logic gate, e.g., an NOR gate, the logic gate controlled by BK_write, BK_read and NVS_TransferF signals. In operation, when the respective memory bank associated with the NVS data transfer circuit in which the selector circuit 354 is included is not performing any memory access operations, both BK_write and BK_read are inactive. When the NVS_TransferF signal becomes active (e.g., at a logic low), the SELECT signal becomes active high, to control the buffer 360 to provide the data from the memory array 352 to the fuse bus.

The selector circuit 354 may also include controlled input buffer 358 and controlled output buffer 356 coupled to each other in parallel, in opposite direction. The buffers 358 and 356 may be controlled by the BK_write (or/BK_write) and BK_read (or/BK_read) signals, respectively. In the above example, when both BK_write and BK_read signals for the respective memory banks are low, and the NVS_TransferF is active low, the SELECT signal is active. In response, both the input and output buffers 358, 356 are deactivated. When the memory array 352 is in normal access operation, e.g., in a read operation, BK_read is active, causing the output buffer 356 to provide the data from the memory bank to the data bus. When the memory array 352 is in a write operation, BK_write is active, causing the input buffer 358 to provide data from the data bus to the memory. In either read or write operation, one of the BK_read and BK_write is active (e.g., at logic high), causing the SELECT signal at the output of the select control circuit 364 to be inactive, disabling the buffer 360. Thus, the data from the memory will not be provided to the fuse bus.

Figure 4:
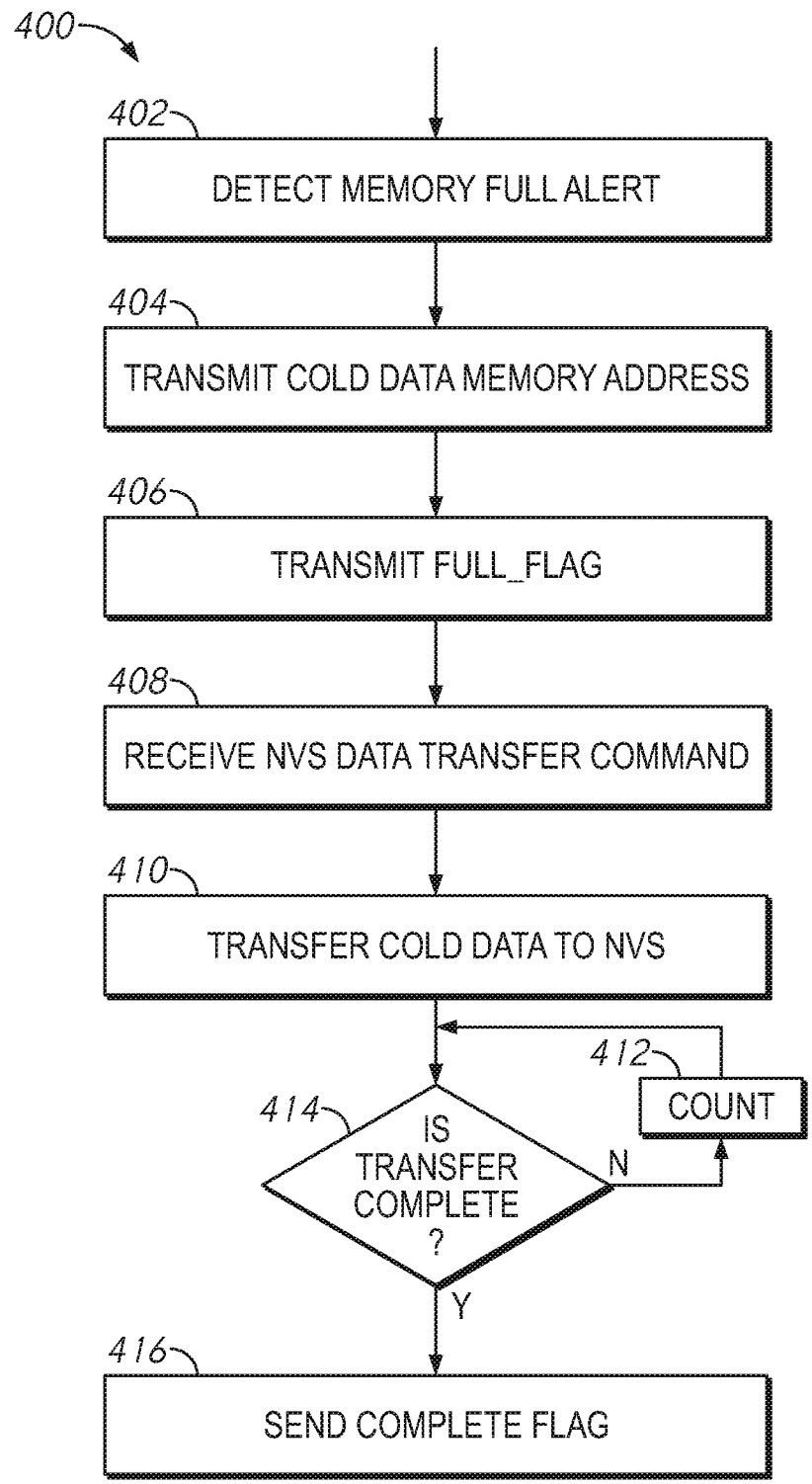
FIG. 4 is a diagram of an example process that may be implemented in a memory device according to some examples of the present disclosure.

The various embodiments described with reference to FIGS. 1-3 may be implemented in one or more processes. FIG. 4 is a diagram of an example process that may be implemented in a memory device according to some examples of the present disclosure. The process 400 may be implemented in a DRAM, such as 104 (FIG. 1A), 200 (FIG. 2), 300 (FIG. 3A), or NVS data transfer circuit 350 (FIG. 3B). For example, the process 400 may include detecting a memory full alert at operation 402. The process 400 may also include transmitting cold data memory address at operation 404, for example, to a controller, and transmitting a memory full flag at operation 406, for example, to the controller. The controller may be implemented in various embodiments such as 102 (FIG. 1A) and 314 (FIG. 3A). In some examples, the process 400 may transmit the cold data memory address and the memory full flag to the controller via the cold data transfer control bus 120 (FIG. 1A). Similar to the embodiments in FIG. 1A, the cold data memory address may include the memory bank number and the segment number in the given memory bank containing the cold data. The operation 404 may transfer the memory bank and segment numbers in a serial manner via a data buffer circuit, such as a FIFO circuit (e.g., 116 in FIG. 1A) and cold data transfer control bus, e.g., 120 (FIG. 1A). The memory full flag may include a FULL_FLAG. For example, the process 400 may transmit an active FULL_FLAG (e.g., logic high) when a criteria for a memory full alert is detected, for example, when the memory is at least 95%, 90%, 85%, or 80% full, or when other criteria has been met.

The process 400 may further receive a NVS data transfer command at operation 408, via the cold data transfer control bus 120 (FIG. 1A). Similar to the manner described in embodiments of FIGS. 1A and 3B, the NVS data transfer command may be a mode register (MR) command, for example, a MR write command that sets a cold data mode in the DRAM. Responsive to the cold data mode being set in the DRAM, the process 400 may start transferring cold data to the NVS at operation 410. As described in FIGS. 1A and 3A-3C, the cold data transfer may be performed by the DRAM device autonomously using a data bus, such as the fuse bus. As a result, the cold data transfer may be performed concurrently with a normal memory access operation. In transferring the cold data, the process 400 may control a selector circuit (e.g., 324 in FIG. 3B, 354 in FIG. 3C) to provide the cold data to the fuse bus. The process 400 may also use a parallel-to-serial circuit (e.g., 308 in FIG. 3A, 336 in FIG. 3B) to provide the cold data on the fuse bus to the NVS device in a serial manner. The memory address of the cold data to be transferred may be stored in a register in the DRAM. The target NVS device and the target address in the target NVS device may be determined by the controller, which sets the destination address in the target NVS device. As shown in FIGS. 1A, 2, 3A and 3B, the process 400 may provide the cold data from the fuse bus to the destination address in the target NVS device (e.g., 106, 108 in FIG. 1A) via the TDQ port of the DRAM and the transfer bus 122a or 122b (FIG. 1A).

With further reference to FIG. 4, the process 400 may also determine whether the cold data transfer is complete at operation 414. For example, this determination may be performed in a counter circuit, e.g., 328 (FIG. 3B). As similarly described in the embodiments in FIG. 3B, the process may use the counter circuit to count at operation 412 until a number of counts have elapsed. In some examples, the counts may be based on the number of clocks required of transferring all of the data blocks in a memory segment of a given memory bank. In other examples, the counts may be based on the number of word lines in a memory segment. The use of counts is optional. In other examples, completion of the cold data transfer may be determined in other ways. The disclosure is not limited to determining completion of the cold data transfer by using counts and/or a counter.

When the transfer has completed, the process finishes the operation 414 and proceed to sending a complete flag at operation 416 to the controller. In sending the complete flag, the process 400 may send an inactive the FULL_FLAG (e.g., a logic low).

Figure 5:
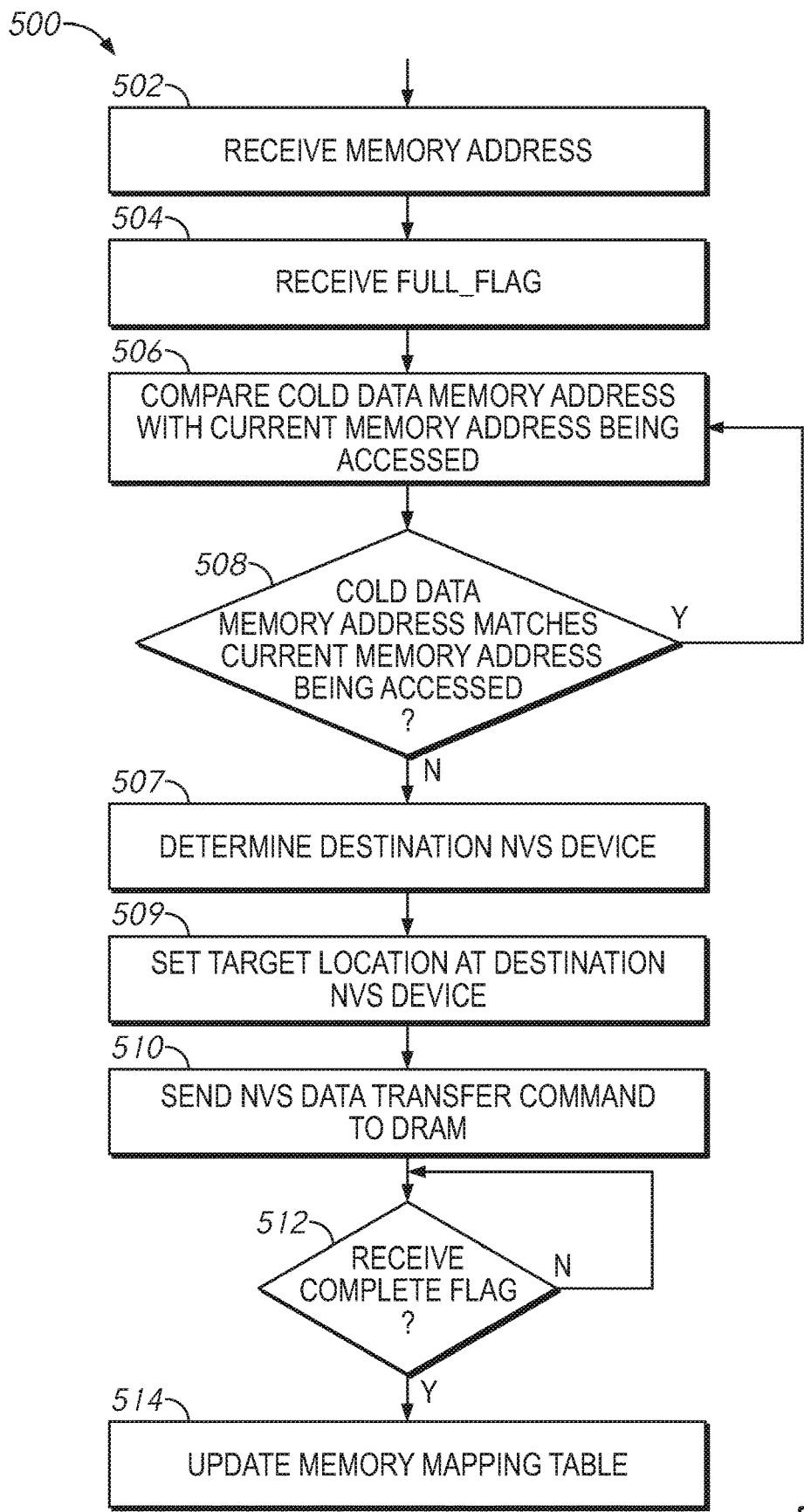
FIG. 5 is a diagram of an example process that may be implemented in a controller device according to some examples of the present disclosure.

FIG. 5 is a diagram of an example process that may be implemented in a controller device according to some examples of the present disclosure. The process 500 may be implemented in a controller device, such as 102 (FIG. 1A) or 312 (FIG. 3A). For example, the process 500 may include receiving a memory address of cold data at 502, and receiving a memory full flag at operation 504. As described in the embodiments in FIG. 1A, the process 500 may receive the cold data memory address and the memory full flag from the DRAM via the cold data transfer control bus 120 (FIG. 1A). The cold data memory address may include a memory bank number and a segment number in the memory bank associated with the cold data. The memory full flag may be an active FULL_FLAG (e.g., a high logic level) that indicates the DRAM has become or is becoming full.

In response to the active FULL_FLAG received from the DRAM, the process 500 may determine whether a cold data transfer should start. For example, the process 500 may compare the cold data memory address with a current memory address being accessed in the DRAM at operation 506, and determine whether the cold data memory address matches the current memory address being accessed at operation 508. For example, the process 500 may use a comparator circuit (e.g., 112 in FIG. 1A) to compare the cold data memory address and the current memory address being access, each address being stored in a respective register. The comparison may determine whether the cold data memory address matches the current memory address being accessed. In some examples, both the bank numbers and the segment numbers in the memory addresses are compared.

Once it is determined that the cold data memory address match the current bank address being accessed at operation 508, the process may send a NVS data transfer command to the memory device at operation 510. If the cold data memory address does not match the current bank address being accessed at operation 508, the process 500 may continue checking at operation 506 until the cold data memory address matches the current bank address being accessed. As described in embodiments in FIG. 1A, before sending the NVS data transfer command, the process 500 may determine the destination NVS device at 507. In some examples, the destination NVS device may be determined based on the memory access type associated with the cold data. For example, if the cold data is for a "WRITE" operation, the process 500 may determine a faster NVS device, such as a NVRAM, to be the destination NVS device. Conversely, if the cold data is for a "READ" operation, the process 500 may determine a slower NVS device, such as a NVM, to be the destination NVS device. The process 500 may further set the target location at the destination NVS device at operation 509 for cold data transfer.

In some examples, similar to the embodiments described in FIG. 1A, the NVS data transfer command may be a MR command that sets a cold data mode in a mode register in the DRAM, causing the memory device to start cold data transfer from the DRAM to an NVS device. As described in various embodiments in FIGS. 1A, 1B, 3A, 3B and 3C, the cold data transfer may be performed in the DRAM independently of normal memory operations using data bus, such as the fuse bus and TDQ port. In such configuration, the cold data transfer may occur concurrently with the normal memory operation of the DRAM. Once the cold data transfer command is sent at 510, the process 500 may check whether the cold data transfer is complete by checking the FULL_FLAG flag at 512. As described in the present disclosure, once the cold data transfer is complete, an inactive FULL_FLAG (e.g., a logic low) may be provided by the DRAM via the cold data transfer control bus 120 (FIG. 1A). The process 500 may proceed to update the memory table (e.g., memory table 128 in FIG. 1A) in the controller at operation 514.

Various embodiments in FIGS. 1-5 provide advantages over existing systems. For example, the cold data may be detected and transferred from the DRAM to a NVS device having a slower memory speed before the DRAM becomes full. This may improve the utilization of the memory device, and improve the overall system performance and user experience. For example, in an electronic mobile device implementing the system described in the present disclosure, a user may have multiple applications open simultaneously. The data for infrequently used applications may be moved from the DRAM to the NVS device to free up more memory space for active applications, completely in the background and concurrently with the normal memory access operations. As such, the user is completely unaware of the cold data transfer.

Furthermore, the cold data transfer from the DRAM to the NVS device may be performed in an alternative data bus, such as the fuse bus, such that the normal memory access in the DRAM may be performed on a different data bus. In the various embodiments described in the present disclosure, cold data transfer and/or data transfer associated with the cold data transfer (e.g., transfer of cold data memory address from the DRAM to the controller) may be performed in a serial manner, which reduces the required hardware cost and bandwidth.

Although the detailed description describes certain preferred embodiments and examples, it will be understood by those skilled in the art that the scope of the disclosure extends beyond the specifically disclosed embodiments to other alternative embodiments and/or uses of the embodiments and obvious modifications and equivalents thereof. In addition, other modifications which are within the scope of the disclosure will be readily apparent to those of skill in the art. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying mode of the disclosed embodiments. Thus, it is intended that the scope of at least some of the present disclosure should not be limited by the particular disclosed embodiments described above.

What is claimed is:

1. An apparatus comprising:
   a plurality of memory blocks;
   first and second data buses coupled to the plurality of memory blocks;
   a non-volatile storage device external to the plurality of memory blocks, the non-volatile storage device coupled to the second data bus and configured to receive data from the plurality of memory blocks on the second data bus, and the non-volatile storage device further coupled to the first data bus and configured to provide data to and receive data from the first data bus; and
   a non-volatile storage (NVS) data transfer circuit coupled to the plurality of memory blocks and configured to transfer data in a first memory block of the plurality of memory blocks to the non-volatile storage device via the second data bus responsive to a data transfer command, when a second memory block of the plurality of memory blocks different from the first memory block is accessed via the first data bus concurrently.

2. The apparatus of claim 1, wherein the second data bus is a fuse bus.

3. The apparatus of claim 1 further comprising a data buffer circuit configured to store address of the first memory block, the address comprises a bank number and a segment number of the first memory block, wherein the NVS data transfer circuit is further configured to provide the address of the first memory block to a controller.

4. The apparatus of claim 3, wherein the first memory block is least accessed among the plurality of memory blocks during a time period.

5. The apparatus of claim 1, wherein the NVS data transfer circuit is configured to transfer the data in the first memory block to the non-volatile storage device external to the plurality of memory blocks when the first memory block is not accessed via the first data bus.

6. The apparatus of claim 1, wherein the data transfer command is a mode register command set in a mode register.

7. The apparatus of claim 1, wherein the NVS data transfer circuit comprises a selector circuit configured to:
   transfer the data in the first memory block to the non-volatile storage device external to the plurality of memory blocks via the second data bus when the data transfer command is active; and
   not transfer the data in the first memory block to the second data bus when the data transfer command is inactive.

8. The apparatus of claim 7, wherein the NVS data transfer circuit further comprises a counter circuit, the counter circuit is configured to be:
   activated when the data transfer command becomes activated; and
   deactivated when data transfer from the first memory block to the non-volatile storage device external to the plurality of memory blocks is complete.

9. The apparatus of claim 8, wherein the NVS data transfer circuit, responsive to the counter circuit being deactivated, is further configured to provide a completion signal to a controller.

10. The apparatus of claim 8, wherein the counter circuit is configured to be deactivated a number of clock cycles after being activated, wherein the number of clock cycles is based at least on a size of the first memory block.

11. A method comprising:
   at a memory device, performing memory operations at a plurality of memory blocks in the memory device via a first data bus in the memory device responsive to memory read or write Currently amended commands from a controller;
   receiving a data transfer command from the controller;
   responsive to the data transfer command, transferring data in a first memory block of the plurality of memory blocks to a non-volatile storage (NVS) device external to the memory device via a second data bus coupled to the memory device and the non-volatile storage device and not via the first data bus coupled to the memory device and the non-volatile storage device.

12. A method comprising:
   at a memory device, performing memory operations at a plurality of memory blocks in the memory device via a first data bus in the memory device responsive to memory read or write commands from a controller;
   at the memory device, detecting a memory full alert;
   responsive to detection of the memory full alert, transmitting address of the first memory block of the plurality of memory blocks in the memory device and a memory full flag to the controller, wherein the address of the first memory block comprises a bank number and a segment number;
   receiving a data transfer command from the controller; and
   responsive to the data transfer command, transferring data in a first memory block of the plurality of memory blocks to a non-volatile storage (NVS) device via a second data bus in the memory device.

13. The method of claim 11, wherein the second data bus in the memory device is a fuse bus.

14. The method of claim 11 further comprising:
   determining whether data transfer from the first memory block to the NVS device is complete;
   upon determining that the data transfer from the first memory block to the NVS device is complete, transmitting a complete flag to the controller; otherwise not transmitting the complete flag to the controller.

15. The method of claim 11, wherein transferring the data in the first memory block to the NVS storage via the second data bus in the memory device is performed when the first memory block is not accessed via the first data bus.

16. The method of claim 15, wherein transferring the data in the first memory block to the NVS storage via the second data bus in the memory device is performed, when additionally, a second memory block of the plurality of memory blocks different from the first memory block is accessed via the first data bus.

17. An apparatus comprising:
   a plurality of memory blocks;
   a first data bus coupled to the plurality of memory blocks;
   a second data bus coupled to the plurality of memory blocks and configured to transfer fuse data from a fuse array in a power-up sequence;
   a controller configured to perform memory read and write operations on the plurality of memory blocks via the first data bus, and further configured to provide a data transfer command responsive to at least a memory full alert signal; and a non-volatile storage (NVS) data transfer circuit configured to transfer data in a first memory block of the plurality of memory blocks to a NVS device via the second data bus, and further configured to transfer the data in the first memory block responsive to the data transfer command from the controller.

18. The apparatus of claim 17, wherein the controller comprises a comparator circuit configured to, responsive to the memory full alert signal, determine whether an address of the first memory block matches a current memory address being accessed; and the controller is further configured to:

provide an active data transfer command responsive to a determination that the address of the first memory block does not match the current memory address being accessed; otherwise provide an inactive data transfer command responsive to a determination that the address of the first memory block match the current memory address being accessed.

19. The apparatus of claim 17, wherein the controller is configured to, before providing the data transfer command:

determine a destination NVS device based at least on a memory access type associated with the first memory block; and set a target location in the destination NVS device.

* * * * *